(12) United States Patent
Pardes

(10) Patent No.: US 6,263,799 B1
(45) Date of Patent: Jul. 24, 2001

(54) VEHICLE GUIDEWAY ADAPTOR FOR A PERSONAL RAPID TRANSIT SYSTEM

(76) Inventor: Herman I. Pardes, 45 Wickapecko Dr., Ocean, NJ (US) 07712-4137

(*) Notice: Subject to any disclaimer, the term of this patent is extended or adjusted under 35 U.S.C. 154(b) by 0 days.

(21) Appl. No.: 09/571,811

(22) Filed: May 16, 2000

(51) Int. Cl.$^7$ .................................................. B61B 1/00
(52) U.S. Cl. ................... 104/28; 104/88.01; 104/88.04; 104/88.06; 104/130.01; 104/130.07; 104/139
(58) Field of Search ................... 104/130.01, 130.07, 104/130.09, 88.04, 88.06, 124, 134, 139, 23.2, 247, 292, 27, 28; 105/215.1

(56) References Cited

U.S. PATENT DOCUMENTS

| | | | | |
|---|---|---|---|---|
| 1,820,034 | * | 8/1931 | Schuberth | 104/27 |
| 3,782,292 | * | 1/1974 | Metcalf | 104/130.01 |
| 3,797,401 | * | 3/1974 | Alimanestianu | 104/130.01 |
| 3,812,789 | * | 5/1974 | Nelson | 104/130.01 |
| 3,838,648 | * | 10/1974 | Dahlberg et al. | 104/139 |
| 3,851,591 | * | 12/1974 | Hickman | 104/28 |
| 3,979,091 | * | 9/1976 | Gagnon et al. | 246/8 |
| 4,061,089 | | 12/1977 | Sawyer | 104/23 |
| 4,083,422 | | 4/1978 | Blakeslee et al. | 180/98 |
| 4,089,270 | * | 5/1978 | Blake | 104/130.01 |
| 4,111,130 | * | 9/1978 | Rodot | 104/28 |
| 4,132,175 | | 1/1979 | Miller et al. | 104/130 |
| 4,522,128 | * | 6/1985 | Anderson | 104/130.01 |
| 4,671,185 | | 6/1987 | Anderson | 104/130 |
| 4,726,299 | * | 2/1988 | Anderson | 104/88.04 |
| 4,965,583 | * | 10/1990 | Broxmeyer | 342/42 |
| 4,991,516 | * | 2/1991 | Rixen et al. | 104/130.01 |
| 5,063,857 | | 11/1991 | Kissel, Jr. | 104/88 |
| 5,138,952 | * | 8/1992 | Low | 105/72.2 |
| 5,199,358 | * | 4/1993 | Barratt | 104/139 |
| 5,277,124 | * | 1/1994 | DiFonso et al. | 104/130.01 |
| 5,318,143 | | 6/1994 | Parker et al. | 180/168 |
| 5,473,233 | * | 12/1995 | Stull et al. | 104/27 |
| 5,611,282 | * | 3/1997 | Alt | 104/88.06 |
| 5,778,796 | * | 7/1998 | Kim | 104/130.07 |
| 5,794,535 | | 8/1998 | Pardes | 104/130 |
| 5,797,330 | * | 8/1998 | Li | 104/28 |
| 6,011,508 | * | 1/2000 | Perreault et al. | 342/350 |
| 6,029,104 | * | 2/2000 | Kim | 104/88.04 |
| 6,095,054 | * | 8/2000 | Kawano et al. | 104/139 |
| 6,129,025 | * | 10/2000 | Minakami et al. | 104/88.01 |

* cited by examiner

Primary Examiner—S. Joseph Morano
Assistant Examiner—Lars A. Olson

(57) ABSTRACT

A transportation system, generically known as Personal Rapid Transit, employs conventional electric or hybrid automobiles (18) underwhich are mounted electro-mechanical adaptors (24) which permits them to operate autonomously on an elevated guideway (16) which is part of the PRT system. An electronic guidance sensor system (45), and other functional components built into the adaptors, permits the vehicles to track unique rf signals emitted from a guidance wire (36) centrally embedded in the guideway, and to exit and enter the guideway to and from off-line stations (10), and to select various platforms and storage areas within these stations.

1 Claim, 7 Drawing Sheets

VEHICLE GUIDEWAY ADAPTOR FOR A PERSONAL RAPID TRANSIT SYSTEM

BACKGROUND

1. Field of Invention

This invention relates to a transportation system, generically known as Personal Rapid Transit, which employs conventional electric or hybrid automobiles under which are mounted electro-mechanical guideway adaptors, which permits them to operate autonomously on an elevated guideway which is part of the PRT system. An electronic guidance sensor system, and other functional components built into the adaptors, permits the vehicles to track unique rf signals emitted from a guidance wire centrally embedded in the guideway, and to enter and exit the guideway from off-line stations and to select various platforms and storage areas within these stations.

2. Description of Prior Art

A variety of ground transportation systems have been developed and put into practice since the advent of the industrial revolution. Private automotive transit has become the method of choice for most commuters throughout the world wherever circumstances permit. The result has been excessive congestion on the highways, traffic delays, and pollution. Despite these facts, mass transit, in the form of rail or bus, has run a very poor second because of high costs and relative inconvenience. This under-utilization has spiraled into even poorer performance for our mass transit systems.

Within recent years, specifically with the advent of efficient electric and hybrid vehicles, inexpensive and reliable computers, and digital communications, a form of mass transit known as Personal Rapid Transit (PRT), which has been in the open literature for many years, has become technically feasible. It eliminates many of the major deficiencies and inconveniences of current mass transit systems. Its salient, and most desirable characteristics from a commuter standpoint include an elevated guideway not vulnerable to normal traffic congestion, with access to this guideway by small, self-contained automated vehicles obtainable at convenient off-line stations. These vehicles can be available on a demand basis, 24 hours per day (24/7), overcoming one of the major faults of current commuter systems which adhere to rigid schedules and frequent stops. Once a vehicle is acquired at an off-line station, and the destination entered into the vehicle computer by either keypad or voice, the vehicle will proceed non-stop to its final destination. Off-line stations can be configured to be accessible by private vehicles adapted to be compatible with the guideway system requirements. The guideways are constructed along the shoulders or rights of way of existing roads or rail corridors, thereby requiring no additional real estate. The footprint is very small.

Initial prior art investigated include: U.S. Pat. No. 5,063,857 to Kissel, Jr. (1991) describes in the narrative of his "Comprehensive Unit Transportation System" most of the features and virtues of PRT. It should be noted that the operational concept of PRT, as described, has been well documented in the open literature for several decades prior to this patent. Specifically, however, the proposed implementation requires a highly specialized vehicle which does not take advantage of the innumerable engineering hours that have gone into the modern automobile. This is very undesirable from an ultimate system production cost standpoint. Also, the vehicle switching system in his patent is dependent upon the motion of a hinged section of the guideway. This is undesirable from a safety and reliability standpoint considering that on a busy PRT commuting system this action may be required several thousand times per day at very rapid rates. It is mandatory to keep the guideway totally passive. U.S. Pat. No. 4,061,089 to Sawyer (1977) with the specific title "Personal Rapid Transit System" describes a unique operational implementation combining frictionless vehicles floating by compressed air over a linear synchronous motor on a specialized conforming guideway. Both the guideway and the vehicle are non-standard and would be very expensive as a production item. As a result, this system has never been implemented. U.S. Pat. No. 5,794,535 to Pardes (1998) "Switching Mechanism For Transit Modules" overcomes the need for any mechanical motion of the guideway at any time, and permits reliable, computer controlled switching at exit and merge points. However, configuration and installation of the electro-magnetic switching mechanism within the vehicle has proven to be sufficiently complex to necessitate major modifications to any standard automobile. Also, the necessity of a mechanical base guide for vehicle guidance is an undesirable feature which increases noise, both audible and electrical, and may decrease overall system reliability. A modification of some of the switching features of this design are incorporated in this invention disclosure. Considering the guidance aspect of the transit vehicle, U.S. Pat. No. 5,318,143 to Parker (1994) "Method And Apparatus For Lane Sensing For Automatic Vehicle Steering" does employ a standard automobile however an active electro-optical system is designed to sense a center stripe on a highway. This is unacceptable and deficient for a system where there are multiple branches and where weather conditions may deteriorate, or obliterate, the strip contrast. U.S. Pat. No. 4,083,422 to Blakeslee (1978) "Bolt-On Guidance System For Lift Truck" describes an automatic guidance device which follows a single radiating wire path embedded in the floor of a warehouse or similar facility. The general technique may be valid for PRT use but is deficient since there is no means of providing branch paths which can be computer selected. The vehicle, of course, is not a standard automobile.

In addition prior art cited, all of the approaches imply the need for a specialized vehicle and mechanical switching and guidance systems. All of the patents reviewed in the prior art such as U.S. Pat. Nos. 4,671,185 (1987) and 4,522,128 (1985) to Anderson, U.S. Pat. No. 5,138,952 (1992) to Low, U.S. Pat. No. 5,277,124 (1994) to DiFonso, U.S. Pat. No. 4,132,175 (1979) to Millerl/Westinghouse, and U.S. Pat. No. 4,991,516 (1991) to Rixen fail to meet the requirements of a viable vehicle and guideway combination for a reliable PRT system with the safety features mandatory for a public mass transit system, or for the employment of a standard automobile which is necessary for a cost-effective commercial product. Minakami et al, U.S. Pat. No. 6,129,025 (Oct. 10, 2000), employs a carrier pallet which rides on a guideway on which any type of vehicle or container can be driven and from there on automatically forwarded to its final destination. It has many of the attributes of a PRT system but has a major deficiency in that commuters must access the pallet with their own vehicle which negates the philosophy of mass transit which is intended to reduce the number of vehicles on the road, and it also should be accessible to the general public who may not have cars or the ability to drive. Also, the pallet and guideway combination are quite complex and may prove to be overly expensive in construction and maintenance. Similarly Barratt, U.S. Pat. No. 5,199,358 (1993) "Vehicle Guideway and System for Mass Transit" utilizes a piggyback operation on which vehicles are attached to electrically operated sled modules. Here again the commuter must have his own vehicle and the guideway becomes relatively complex. System communication, as required in a PRT system, is inherent in Gagnon et al, U.S. Pat. No. 3,979,091 (1976) however this design does not provide accurate lateral vehicle position within the narrow confines of a guideway. The patent was not intended for that purpose. A form of system communication via a transmission line along the guideway, or wayside, as described may be employed. It is not claimed in this patent.

Objects and Advantages

Accordingly, several objects and advantages of my invention are:

(a) to provide a transportation system known as Personal Rapid Transit (PRT) whose major components consist of an exclusive guideway, off-line stations, automated transit vehicles, and the computer/software to provide integrated system operation.

(b) to provide a multi-level off-line station configuration, primarily for a suburban type system, that allows for expanded storage of transit vehicles on a lower level, passenger discharge on this lower level, vehicle transfer by ramp to a second level, and passenger access to transit vehicles on this second level, which connects to the main guideway.

(c) to provide an off-line access port in proximity to the multi-level off-line station allowing alternative vehicles, which conform to guideway standards, to access the main guideway.

(d) to provide a single-level off-line station configuration, primarily for an urban type system, which consists of multiple parallel tracks to provide through traffic station by-pass, passenger discharge, limited transit vehicle storage, passenger access to transit vehicles, and a special track for wheelchair compatible vehicles to accommodate disables passengers. Transit vehicles are automatically steered onto the proper track by selective rf guidance signals emitted by each track to an inductive pickup on the vehicles.

(e) to provide an electro-mechanical adaptor system which can be readily attached to a standard electric or hybrid automobile to make it compatible with all the operational and human factors requirements for a transit vehicle which is a major component of a total PRT mass transit system. Utilization of a standard automobile, with minimum modification, is mandatory for the cost-effective, safe and reliable operation of a commercial PRT system. This approach will also take advantage of the innumerable engineering hours invested in automotive design and will radically reduce the cost of the overall system from the standpoints of initial cost and subsequent maintenance. Prior art described above was generally conceived around highly specialized vehicles and guideways which resulted, or would result, in adverse effects on system performance, production and/or operational costs. For this, and other reasons, there is no PRT system functioning today.

(f) to provide a primary electronic guidance system in the vehicle adaptor which can inductively sense multi-frequency emitter wires or cables centrally embedded in the guideway, and accurately track the desired frequency path as selected by an on-board computer.

(g) to provide within the vehicle adaptor a means of transmitting broadband communication data to all sections of the PRT system using the guidance wires or cables embedded in the guideway.

(h) to provide an electro-magnetic guidance system in the vehicle adaptor, activated by the on-board computer, which will serve as a redundant backup for the primary guidance system to insure reliability on critical sections of the guideway.

Further objects and advantages of my invention will become apparent from a consideration of the drawings and ensuing description.

DRAWING FIGURES

SUMMARY

This invention relates to a transportation system which uses standard electric or hybrid vehicles as integral parts of a Personal Rapid Transit System. Use of standard automobiles will insure the cost-effective viability of the PRT system in all phases of production, maintenance and commuter acceptance. All components necessary to allow these automated vehicles to navigate and communicate on the system's guideway, and within its off-line stations, are contained within an electro-mechanical adaptor mounted beneath each vehicle, with the exception of the steering servo drive, and brake and accelerator servos which are within the vehicles themselves.

DESCRIPTION-FIGS. 1 TO 7

Figure 1:
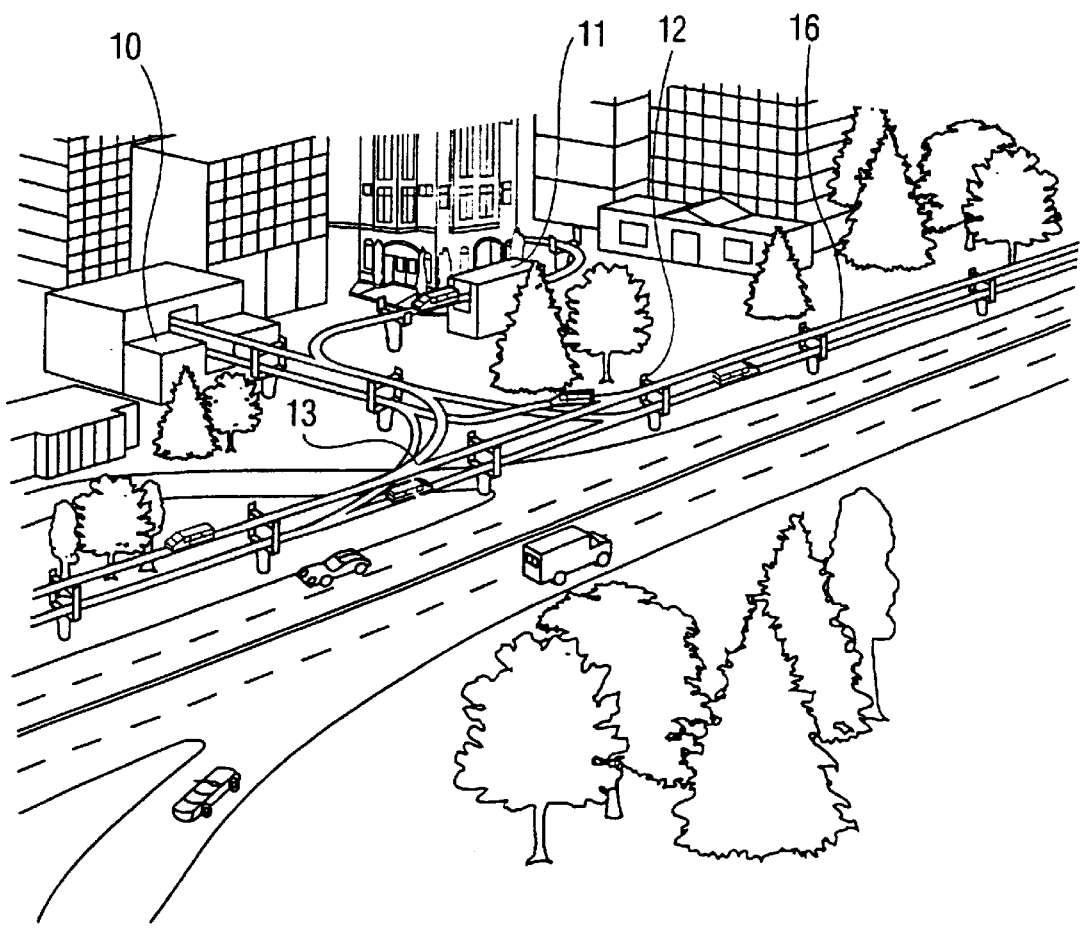
FIG. 1 shows an artists concept of a two level bi-directional suburban PRT commuter system with an off-line station for transit vehicles and a checkout area for privately owned electric vehicles leading into a main elevated guideway. An urban PRT guideway system would be single level and uni-directional.

FIG. 1 is a typical embodiment of a dual level, bi-directional PRT commuter system to illustrate the environment of the transit vehicles, or private electric vehicles, as they access or exit the main guideway 16. An urban system would be single level and uni-directional. Off-line stations 10, which contain PRT system vehicles, are placed at convenient locations for commuter or pedestrian convenience. Separate off-line access stations 11 are available for private vehicles, In either case there are numerous paths and automatic switching actions required at all positions similar to 13 to enable the vehicles to proceed to their destinations. Support structures 12 occur at intervals along the guideway. These support structures also contain a digital bar code display which can be read off by electro-optical means on the vehicles as they pass so that each vehicle's computer can determine its position and be knowledgeable of guideway status in event of emergencies. There is also a bar code reader on the structure to read status information from passing vehicles, and transmit this to a central computer to update total system operational status and alert the system to individual vehicle problems should they occur.

Figure 2:
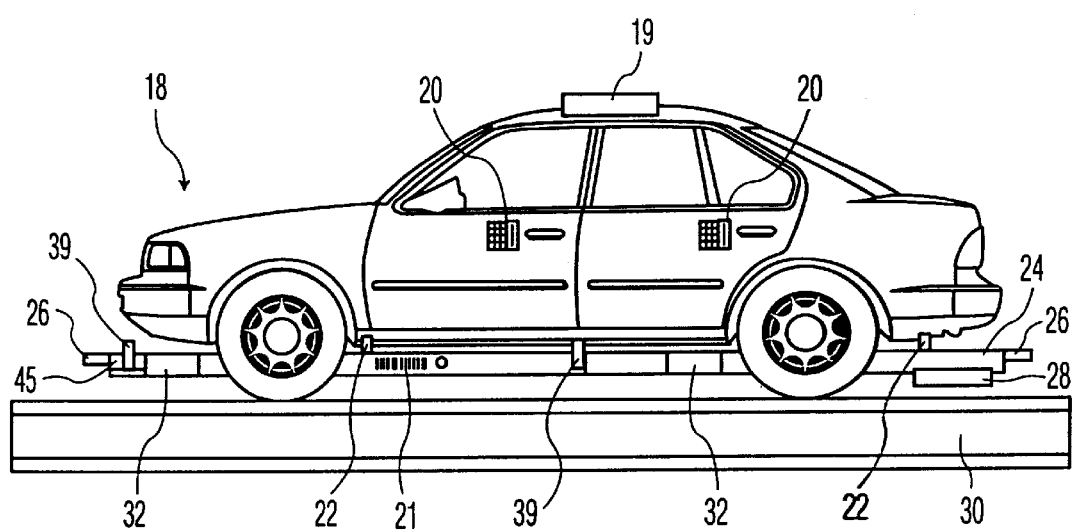
FIG. 2 shows a typical standard automobile with the vehicle guideway adaptor attached below the chassis, and a small section of the I-beam support structure of the PRT guideway.

FIG. 2 is a side plan view of a standard electric automobile 18 on to which is bolted the complete adaptor frame 24 to hardpoints on the vehicle chassis by bolts 22. Most of the additional features would normally be obscured by a steel lateral constraint, which is approximately 10" high. The constraint is not shown in this drawing. An electro-magnetic autolink fixture 26 is mounted on both ends of the adaptor, controlled by an on-board computer, to permit two or more vehicles on the guideway to link together, when appropriate, to increase the capacity of the guideway and decrease the wind resistance and power requirements of following vehicles. A guideway wire sensing module 45 is at the front of the adaptor to track an rf radiating wire embedded in the center of the guideway. This is the primary navigation device in the system and provides steering information to the on-board computer and to the steering servo within the vehicle. Parts 32 and 39 are secondary electro-magnetic backup components which are selectively attracted to the steel lateral constraints at critical points on the guideway such as merges, exits and curves. Module 21 is a dynamic bar code assembly which presents data, such as vehicle origin and destination, passenger complement, etc., obtained from the on-board computer. The dynamic bar code also functions in an interactive mode with readers on the guideway, or in an off-line access port, as "built-in test equipment" to display vehicle compliance with system safety and operational requirements. Bar code readers are spaced along the guideway to pass this data on to the systems central control station. The module also reads data from bar codes along the guideway. A contact power pickup module 28 is physically coupled to the vehicle in most sections of the guideway; in other sections the vehicle is run on internal batteries. In the case of the hybrid vehicle this function would not be necessary since a hybrid vehicle is self-supporting from an electrical power standpoint. On each of the doors, or other part of the vehicle, is a credit card type receptor 20 and a keyboard or voice recognition component, which is activated by the passengers to open a specific door and enter destination information to the on-board computer. The credit card would be charged according to destination and other criteria. The destination information is displayed on 19 which may make ride sharing feasible if another passenger on the platform is going to the same destination. There will be a financial incentive to share vehicles since this will obviously increase the capacity of the system. All other major control modules and components are within the adaptor and not shown.

Figure 3:
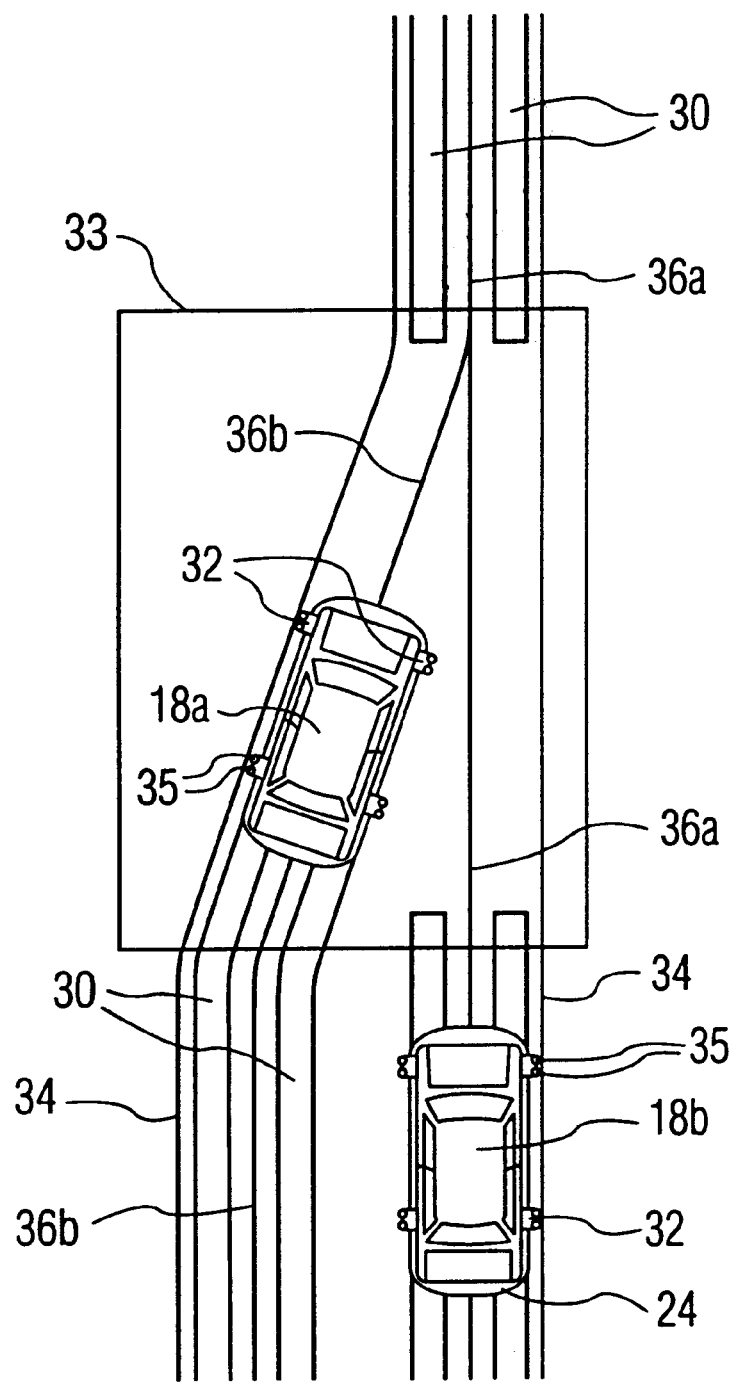
FIG. 3 shows a top plan view of a typical guideway section with a vehicle entering the main guideway ahead of a vehicle already on the guideway. It shows lateral constraints which are engaged by an electro-magnetic guidance control mechanism at merge and exit points of the guideway.

FIG. 3 is a top plan view of a section of the PRT system guideway at a point of entrance into the main guideway. Transit vehicles 18a and 18b are shown on the guideway in positions such that 18a, which is proceeding from a siding or station, is in the process of entering the main high speed line ahead of vehicle 18b. Means are provided, initially by a central computer scheduling control which is contained in the overall system software, and secondarily by continuous communications between the vehicles which provides mutual position, range and range rate information, to insure that the vehicles are not on a collision course. The vehicles are cooperative in the sense that each can accelerate, or decelerate upon command. Techniques for implementing this capability are well known by those familiar with the computer and intercept art. The main track of the guideway is constructed of steel I-beams 30, or pre-stressed concrete, and the construction is normally open. In merge or exit areas 33 the surface is closed to allow a smooth transition. Embedded throughout the length of the guideway is a multi-branch guidance wire or cable 36a which emits an rf signal which can be inductively sensed by a steering module contained in the adaptor. The emitted frequency in the guidance wire 36b is different than that in 36a and is sensed by the steering module in vehicle 18a, in accordance with instructions from an on-board cpu, to provide guidance information into the merge area. This is the primary steering mode for each vehicle. Lateral constraints 34 are steel side structures built onto all sections of the guideway. Their height extends to the top level of the adaptor but is low enough to insure that the vehicle doors can open with sufficient clearance. Under normal conditions the vehicle guidance under primary control is sufficiently precise so the vehicle is in close proximity but not in contact with the lateral constraints. As a safety factor on guideway curves, particularly under icy weather conditions, one of a pair of electro-magnets 32 in the adaptors of each vehicle is activated selectively by an on board computer. The lateral constraints on the guideway are narrowed slightly in these areas so the primary steering is not affected. This mechanism provides positive secondary guidance to the vehicles at all sections where centrifugal forces would tend to drive it off its central path. This is particularly critical under icy conditions when the steering tires have little traction and the vehicle is exiting at high speed from the main guideway.

Figure 4A:
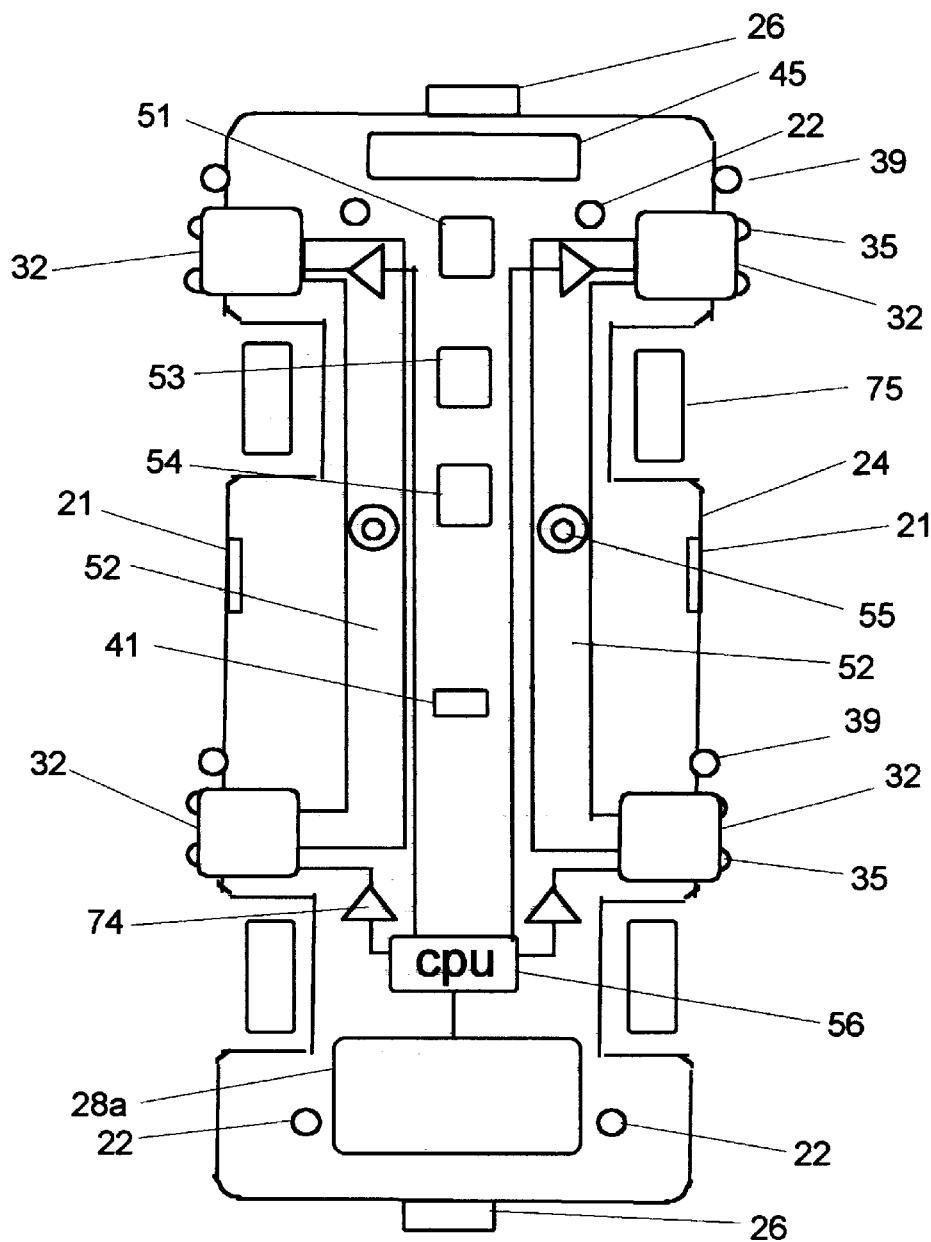
FIG. 4a shows a bottom plan view of the vehicle guideway adaptor with the major sub-components required to provide all the necessary functions to permit vehicle operation on the PRT system.

FIG. 4a is an open view of the major components within the transit vehicle guideway adaptor 24. The purpose of the transit vehicle guideway adaptor is to permit an electric or hybrid automobile to be used in the PRT system. The adaptor is standardized such that it is adaptable to a variety of automobile types or classes with minor modifications to it or the vehicle. Its width is slightly wider than that of any specific class of vehicles, and it effectively determines the width between the lateral supports on the guideway. Attachment bolts 22 rigidly clamp the adaptor into hardpoints in a specific vehicle. On both ends of the adaptor are electro-magnetic autolink modules 26 activated upon command by a central processor unit (cpu) 56 which controls all functions within the adaptor and the vehicle to which it is attached. Instructions to the cpu are either pre-programmed, or received from bar code data read off along the guideway, or from continuous updated communications information from the PRT system's central control. The purpose of the autolink module 26 is to permit two or more vehicles on the guideway to be linked together, when circumstances are favorable, thereby greatly increasing the capacity of the guideway and also decreasing the power requirements of the following vehicles by virtue of much decreased wind resistance. A steering module 45 is mounted in the forward end of the adaptor which inductively senses a specific rf emission frequency from a guidance wire, previously described, which is embedded along the length of the guideway, and through exit and merge areas, and within the lanes of the off-line stations. The specific frequency to be tracked by the steering module is selected by the cpu. The signal from the steering module is continuously compared with the signal from a steering servo transducer mounted within the body of the basic vehicle, and the error signal is fed back to the steering servo to bring the vehicle exactly on line with the guidance wire. This is standard, well known servo design, and the electronics to perform this function are contained in one or two microchips. Similarly, braking signals are fed from the cpu and brake sensing module 51 to maintain vehicle velocity as a desired speed. Braking is performed either regeneratively by using the electric drive motor wherever possible to feed energy back into the system or to recharge the on-board batteries, or by activating a brake servo within the body of the basic vehicle. Overall vehicle velocity is controlled by the output of a power control module 53 which controls the power fed into the electric drive motor from the power transfer assembly 28a. An electric vehicle would draw comparatively low power out of the system at normal cruise speed, just enough to overcome wind resistance and friction. Anything in excess of that, as for initial acceleration which lasts for about 15 seconds on average, or going up steep inclines, is drawn out of the on-board batteries using high power solid state switching components contained in module 53. This type of solid state switching is well known to the automotive industry as a result of prior work on electric cars. Switching control is performed by the cpu which monitors all aspects of power consumption. Hybrid vehicles, which currently have very low emissions will probably be acceptable for PRT. These would be totally self-contained from a power drive standpoint, other than the fact that re-fueling would be necessary periodically. However, the overall guideway system if a hybrid vehicle is used is thereby highly simplified. System communications is optimally performed by coupling signals onto the guidance wires, or cables, since these are already embedded throughout the guideway and off-line stations. The technology to perform the required wideband video digital data tranfer inductively over cables has been demonstrated by several commercial concerns and is readily applicable to this system. A communication module 54 provides the means to transmit and receive data, and a connector module 41, is included on the adaptor to feed audio and video to passengers within the transit vehicles, and other data to the various servos and power users in the vehicle. This is an interactive system such that passengers can relay commands to the cpu and to a central control station in event of emergencies. There are, of course, numerous other means of data transfer technologies which may be applicable throughout the system and its vehicles, and this disclosure is not intended to limit the function of the adaptor to a specific type. Safety or backup features for vehicle guidance are incorporated in the adaptor module which are activated by the cpu upon command. These are the sets of electro-magnets 32, and power amplifies 74, and their pivotable connecting yokes 52, which are mounted on either side of the adaptor. When activated selectively by the cpu at critical curved sections of the guideway where the transit vehicles may experience a centrifugal force tending to make them fly off on a tangent, the electromagnets hold them securely to the lateral guideway restraining structure. This is of importance under icy conditions when the vehicle tires may have little traction at the high speed exits, mergers, or similar areas of curvature. The lateral restraining structures are also slightly narrower in these critical areas, and in the station areas, so that there is no excessive motion from the wire guided path. A digital potentiometer readout 55 is mounted on the yoke pivot axis. Its function is to measure guideway curvature and to provide redundant back up to the steering data from the guidance wire and steering module. A final safety feature is a vertical restraining rod 39, which is forward of each of the electromagnets and activated by the same command as activates the electromagnets. These hook under a safety constraint of the top of the lateral guideway restraints at each critical curve. These are rubber covered rollers for minimum noise and friction. They are normally recessed or rotated parallel to the adaptor frame. There are idler wheels 35 built into each of the electromagnet frames such that the vehicles ride smoothly against the steel lateral restraining walls and maintain a small gap between the electromagnets and the restraining wall. The vehicle wheels 75 are in their normal positions as shown within the adaptor frame space.

Figure 4B:
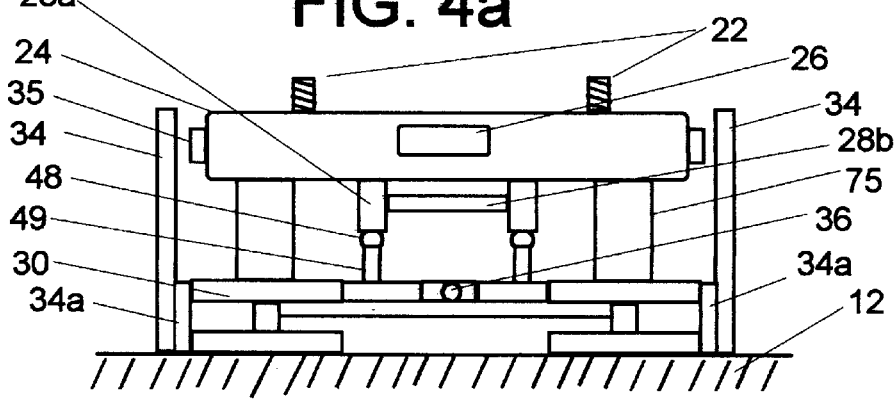
FIG. 4b shows a cross-section of the guideway with the vehicle adaptor contact power pickup in place.

FIG. 4b is a cross-section of a typical part of the PRT system guideway to illustrate how the vehicle adaptor would ride within it, as attached by bolts 22 to the vehicle itself, which is not shown. There is normally clearance between the idler wheels 35 and the lateral constraints 34, as provided by a spacer 34a, except when the backup electromagnets in the adaptor are activated by the cpu at critical areas of the guideway. Normal guidance is provided by the aforementioned guidance control module which picks up a guidance signal from an embedded wire 36 which runs, with different rf signals as necessary, throughout the guideway. The vehicle wheels ride on steel I-beams, or pre-stressed concrete girders, supported by reinforced concrete structures 12 located at regular intervals along the system right of way. Power for each of the electric vehicles, if such are used, is provided by a pair of wires or rods 48 supported on sturdy insulators 49 which comprise the sliding contact power transfer system. Power pickup 28a is bolted onto the transit vehicle adaptor; 28b is a cross member to provide rigidity to the power pickup.

Figure 5:
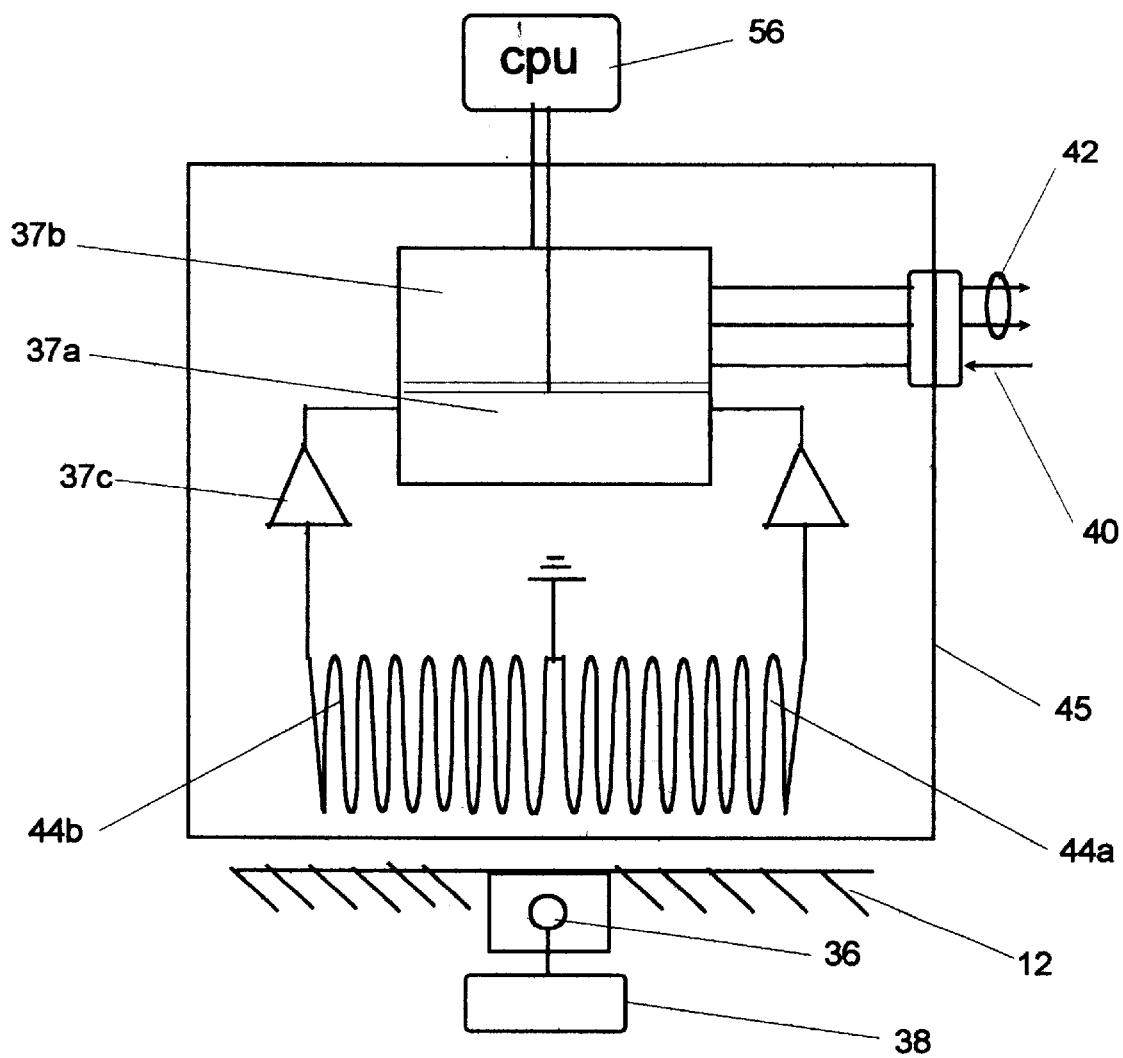
FIG. 5 shows the sub-component assembly of the circuit board, with an inductive pickup, which provides primary guidance information to the vehicle steering servo as derived from a guidance wire or cable embedded through the length of the PRT guideway, its merge and exit areas, and its off-line stations.

FIG. 5 shows essential features of the guidance control module 45 which is installed in the forward position of the vehicle adaptor. A pair of inductive pickup coils, 44a and 44b, are mounted on a circuit board to straddle the guidance wire 36. The output of the coils goes through detector amplifiers 37c into the first section of the control module 37a whose function is to provide a specific bandpass channel as determined by the cpu 56, and rectify and digitize the signal from each section. An rf generator 38 provides unique stable rf signal for any section of the guideway or station area, in its original construction, and this signal is known to the cpu as part of its guidance instructions. The signals are then fed into the comparator section 37b where the amplitudes are very accurately compared to determine whether the coil sections are to the right or left of the guidance wire and send a differential error signal, right or left, through cable 42 to the steering servo in the transit vehicle. Steering wheel positional information is fed back to the comparator through a cable 40. When the vehicle is moved directly over the guidance wire the output of both sections of the pickup coil will be equal in amplitude and the error signal to the steering servo will be zero. In practice, all components on the guidance control circuit board, other than the pickup coil, will probably be contained in one integrated circuit. Incremental correction changes are sampled at a high rate consistent with the needs of the overall system. The technology for performing this function is very well known in the engineering field, having been applied anywhere from radio control toys to the movement of massive cranes, so there is no need to describe further details here.

Figure 6:
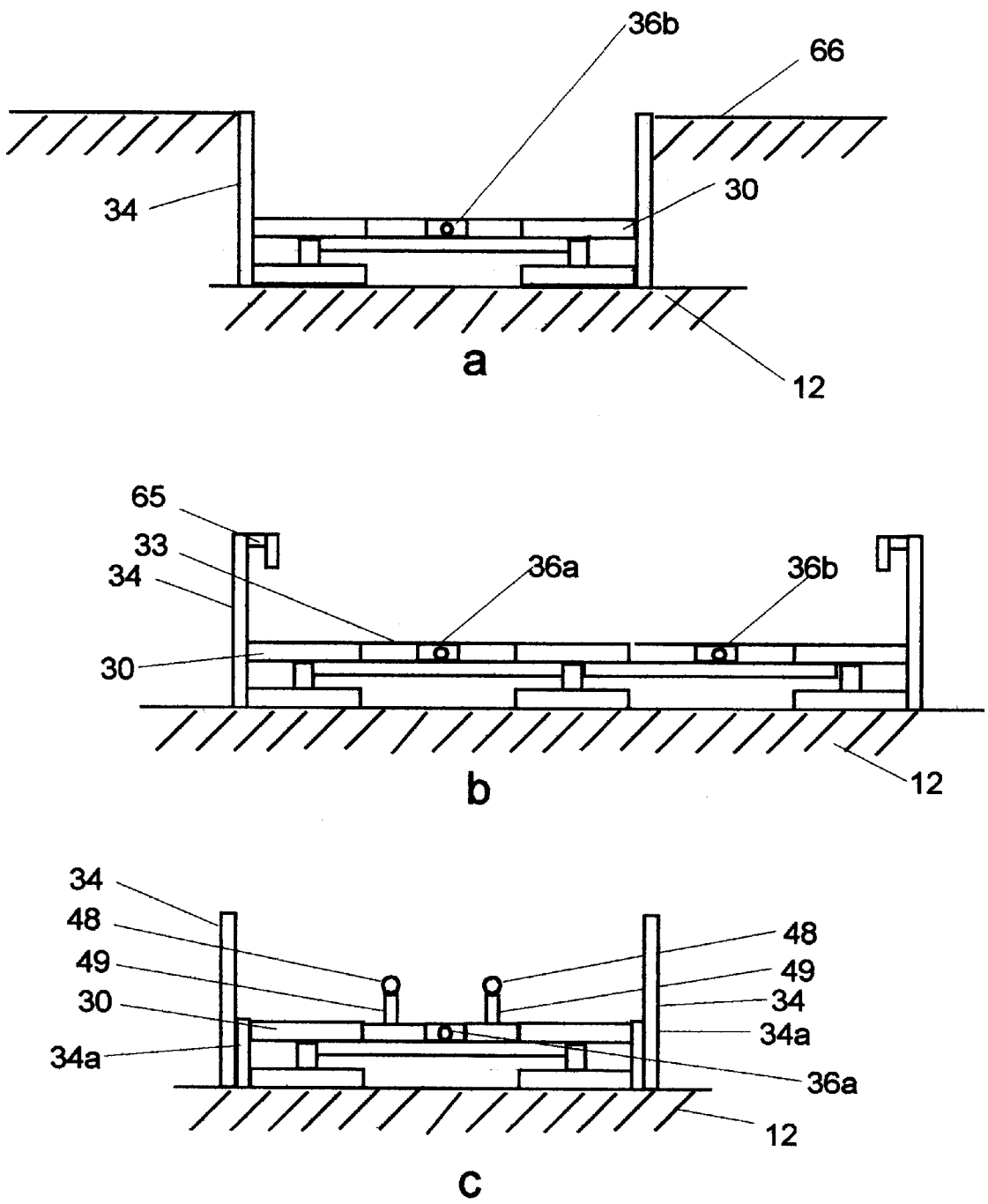
FIG. 6 shows guideway cross-sections at various critical points of the guideway assembly, namely the standard section which is the majority of the guideway length and which contains the contact power transfer system, a smooth merge or exit section, and a section within an off-line station.

FIGS. 6a, 6b, and 6c show cross sections of the guideway in three typical locations. FIG. 6c is essentially the same as FIG. 4b previously described but without the vehicle adaptor in place. FIG. 6b is a merge or exit section where the surface 33 is smooth to permit unobstructed vehicle transition. There is no external power source in this section as there is in 6c, and the vehicles are switched to their internal batteries prior to entering. Guidance wire 36a is at the rf frequency of the general guideway, and guidance wire 36b emits a different frequency known to the cpu so that a specific vehicle can be directed accordingly. Every open smooth section is an area where the vehicle can stray off its wire guidance path, particularly in icy conditions. In these areas the vehicle is magnetically attracted to specific lateral guidance structures by selective cpu activation of the on-board electro-magnets. Safety rollers 39 on the adaptor slide into the hook section 65 on the lateral guidance structure.

FIG. 6a is a cross-section in an off-line station. The lateral constraints are very close to the vehicle adaptor but the electro-magnets need not be activated since vehicle speed is very low. The guidance control tracks the frequency of 36b and the vehicle stops to discharge or pick up passengers on platform 66 under command of the cpu. There may be a multiplicity of platforms in any off-line station and each will have its unique guidance wire frequency and function which is known to the cpu and the system central control.

Figure 7:
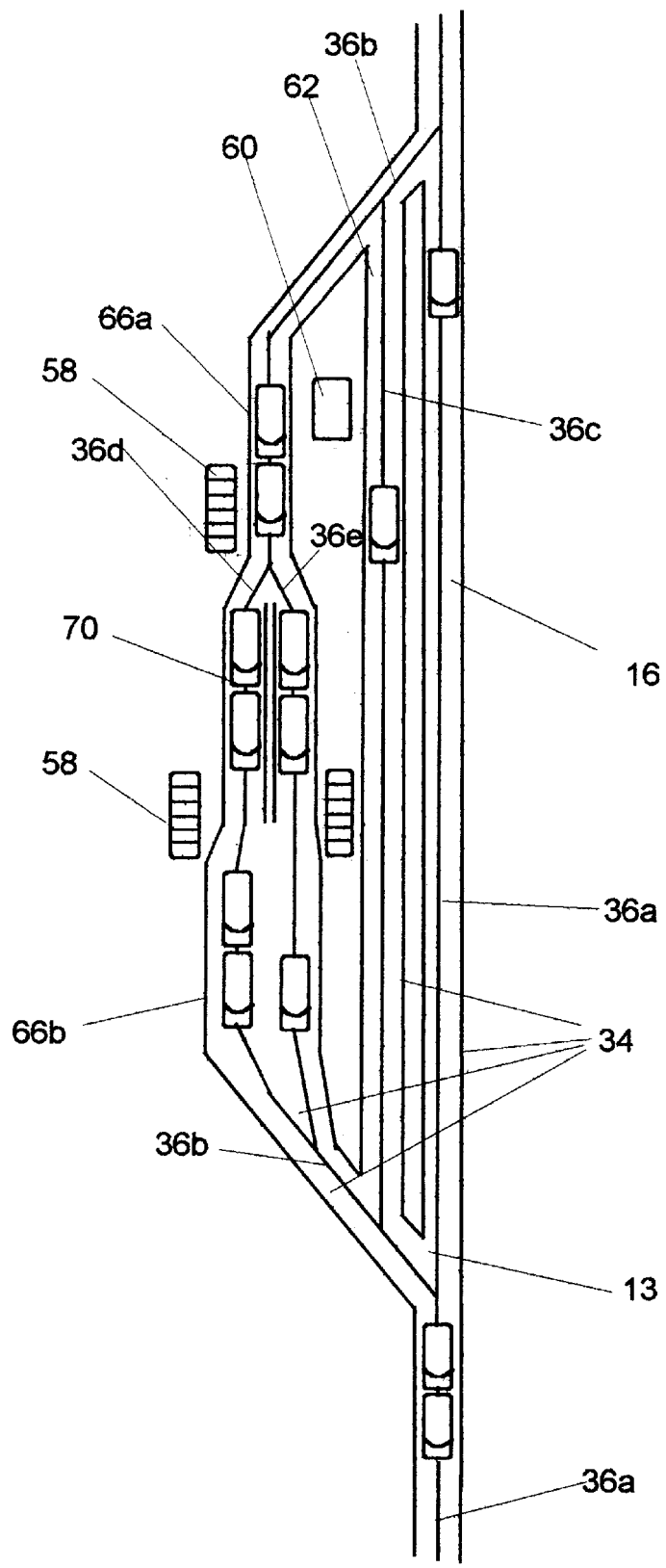
FIG. 7 shows a top plan view of the guideway sections within a typical single-level urban off-line station with various alternative paths for the vehicle to follow as determined by its on-board computer.

FIG. 7 is a top plan view of an off-line station in an urban PRT system. Transit vehicles approach under guidance control tracking guidance wire 36a. Since vehicles operate in an origin to destination mode, those vehicles which are not programmed to stop at a particular station continue on the guideway tracking the signal in 36a. Those vehicles to be diverted to the station will track frequency 36b and thence either 36c into a special bypass, or continue with 36b into the main part of the station 66a for passenger discharge. Once passengers are discharged the vehicle is commanded to track either frequency 36d or 36e, or any of a multiplicity of frequencies into a storage area 70. When commanded by the cpu they proceed to area 66b for passenger pickup, tracking frequency 36b again, and thence onto the main guideway under control of frequency 36a. The special bypass track is included for three reasons, the first is to provide an alternate pathway for a special vehicle which has a wheelchair capability to comply with the requirements of the Americans with Disability Act (ADA). A small number of transit vehicles will have this capability and these will be stored at various known locations within the system. These can be called up by computer command, when requested by a special commuter code, to this bypass track in a very short time. The second rationale for this bypass track is to provide a means, during high traffic periods, for passengers with different destinations to enter the same vehicle at 66b, enter their individual destinations, and be dropped off sequentially at their chosen destination on the bypass track platform under the most efficient computer generated route. There are no commuter pickups in this bypass track. This is not the optimum origin to destination mode but only a maximum of four stops will be needed under rush hour conditions with minimum delays at each stop. The system capacity will be greatly enhanced by this operational mode and since the vehicles are available on demand from the storage area, actual delays will be negligible compared to current mass transit systems. A third use for the bypass track would be to shunt a vehicle to another station, after passenger drop off, if the local storage is filled. Access to the urban off-line station is by staircase or escalator 58, or elevator 60 for wheelchairs. In all cases, the system computers track all vehicles and have full knowledge of their whereabouts, the vehicles' conditions, passenger names, origins and destinations, and other information necessary to make the system efficient, cost-effective, and personally secure.

OPERATION-FIGS. 1 TO 7

In operation, the transit vehicle 18 is directed along the high speed portion of the guideway 16 controlled by the guidance system 45 following an embedded guidance wire 36 emitting rf radiation at a specific frequency. As the vehicle approaches a point of divergence within the guideway system the on board computer 56 makes a decision as to the path to be followed from its preprogrammed internal information. If the decision is to divert the vehicle to any path other than the high speed line, computer logic will inform the guidance system of the new frequency of the embedded guidance wire to follow, and also activate the appropriate backup electro-magnetic safety mechanism 32 to attract it to a lateral constraint 34, otherwise, the guidance module will track the original frequency, and the alternate electro-magnetic safety mechanism will be activated and the vehicle will proceed down the high speed line. In the reverse situation the vehicle is directed from a siding leading from an off-line station onto the high speed line as is shown in FIG. 3 and the appropriate frequencies are followed as directed by the guidance system and computer. In original assembly, standard electric or hybrid automobiles are fitted with the necessary servo systems to be functional with the automobile guideway adaptor 24. According to the PRT concept, the overall PRT system is continuously monitored by a central control station and computer system which has oversight of each of the transit vehicles, as well as the condition of the guideway and the off-line stations, and has cognizance of the cpu 56 in each vehicle. The guidance system 45 in each of the guideway adaptors, in conjunction with each of the major components and the cpu enclosed in the adaptor, and the communications system which is part of the PRT guideway, provides for autonomous operation of each vehicle from the time a passenger inserts his/her credit card and desired destination at the origin, enters the vehicle, and disembarks at the final destination. At each of the merge or exit points, for electric vehicles the power transfer lines 48 are discontinued and power is automatically switched to on-board batteries to insure unobstructed crossover. For hybrid vehicles this function is not required. This is also true within all the off-line station areas. There are numerous safety features and redundancies 32 built into the adaptor, as well as those provided by the guideway lateral constraints 34, to insure accurate and reliable operation of the guidance system. An interactive communications system permits passenger intercession, for emergencies, at any time during the trip, as well as providing video and audio to the passengers and the central control station for ultimate personal security. There are no moving parts in any part of the guideway system ensuring switching safety and reliability. Access to wheelchair passengers is provided by special vehicles available upon request, and a special bypass track 62 is provided at the off-line stations for this purpose in the single level off-line station, and within the lower level of the bi-level station. The essence of the operation, as made possible by this invention, is that a standard production type automobile can be used in a PRT system ensuring cost-effectiveness and safety of the total system by taking advantage of all the advances in engineering in automobile design. Additionally, familiarity with the vehicle will ensure passenger confidence and acceptance of this unique mass transit concept. In the event that a total system power failure occurs the battery supply on board the vehicle has sufficient capacity to fulfill all functions necessary to direct the vehicle and drive it for several miles to an exit lane. This battery is also used within the confines of the offline stations where it is not desirable to have a live power source exposed, and also to present no impediments to passengers crossing the tracks in getting off or on the vehicles, and to make easy maneuvering of the vehicles to storage areas.

Summary, Ramifications and Scope

Accordingly, the reader will see that the automobile guideway adaptor and the guidance system, in conjunction with the special functional components within the adaptor, will present the ultimate in cost-effective design, simplicity and reliability for a PRT system, particularly when compared to with those cited in the prior art. There are sufficient hardpoints on all standard automobiles, particularly the tie-down points which are used for trailer transport, to insure that the guideway adaptor can be custom designed for each group of vehicles considered for the overall PRT system. The guidance wires or cable will become an integral part of the PRT guideway during construction and will actively radiate an rf signal specific to each guideway section for merge, exit and platform station and storage requirements. These signals are accurately tracked by a computer controlled guidance component in the guideway adaptor to direct the vehicle from origin to destination. Similarly, the guidance wires or cable serve as a conduit for wide band video and digital data receivers within the adaptor and a central control station. Data can be acquired on the fly by the vehicle by bar code type readout and pickup along the guideway and within the vehicles' guideway adaptor. A large multiplicity of system vehicles can be accommodated on the guideway as traffic requirements dictate, and privately owned electric vehicles can be accommodated if equipped with a guideway adaptor.

The ramifications of the successful application of this invention are considerable since it makes possible the installation of a cost-effective PRT system in current urban and suburban environments. There is no limit to the extent of a PRT infrastructure since it does not require the construction of new highways or rail lines, but instead uses a small area of the shoulders or right of way of existing corridors. The footprint of the elevated guideway along the right of way is very small. It effectively adds a third dimension to our commuter system. Recent studies indicate that a large percentage of commuters who currently use their cars, can be accommodated by a functioning PRT system with resultant advantages to normal auto traffic, great reduction in highway congestion and auto pollution.

Although the description above contains many specifications, these should not be construed as limiting the scope of the invention but as merely providing an illustration of the presently preferred embodiment of this invention. For example, the paths to the off-line stations may be remote from the guideway to allow greater flexibility in system design or production, or greater convenience to the commuter, whether pedestrian or by private car, or in a location capable of providing greater storage areas. Similarly, the design of the components within the guideway adaptor can be modular such that the exact technology described may be altered if an alternative technique is determined to be superior to perform the same function with improved reliability, cost and safety. Also, no part of the design shall be such as to limit the growth of the overall system.

The above disclosure is merely illustrative and changes may be made in detail with respect to shape, size and structural arrangements within the principles of the invention to the full extent intended by the broad general meaning of the items expressed in the claims. Thus the scope of the invention should be determined by the appended claims and their legal equivalents, rather than by the examples given.

I claim:

1. A transportation system comprising;

a. a combination of a multi-level off-line station, primarily for a suburban transportation system, which connects to a main guideway by a plurality of merge guideway sections which direct transit vehicles to said main guideway, said multi-level off-line station configuration, which may be remote from said main guideway, allows for expanded storage of said transit vehicles on a lower level, passenger discharge on said lower level, pickup of wheelchair passengers on said lower level, vehicle transfer by ramp to a second level, and passenger access to said transit vehicles on said second level, which connects to said main guideway;

b. a combination of main and branch guideways of said transportation system, each main and branch guideway being provided with a central embedded wire or cable radiating rf energy at a unique frequency associated with said guideway sections, said unique rf frequencies to be sensed for vehicle guidance;

c. a conventional electric or hybrid automobile transit vehicle having mounted thereunder a vehicle guideway adaptor containing dual inductive pickup coils, said coils and associated electronics capable of sensing unique rf frequencies radiated by said central wire embedded in said guideway sections, selection of said unique rf frequencies determined by a computer in said vehicle guideway adaptor in accordance with destination information provided by each passenger, said computer generating error signals which are fed to a steering servo in said transit vehicle enabling said transit vehicle to navigate autonomously and accurately along said guideways, said transit vehicle also provided with brake and accelerator servos activated by said computer;

d. an off-line access port in proximity to said multi-level off-line station, allowing privately owned alternative vehicles equipped with said guideway adaptor to enter an inspection area in said off-line access port allowing inspection of said alternative vehicle by interactive means between dynamic bar code display on said guideway adaptor and bar code reader in said inspection area before allowing vehicle onto said main guideway;

e. a single level off-line station configuration of the transportation system, primarily for an urban transportation system, comprising multiple guideway tracks accessed by selective rf frequency discrimination by said vehicle guidance module computer, said tracks being related to through traffic bypass, and platform functions such as passenger dropoff, passenger pickup, vehicle storage and special station bypass, said bypass to provide special access to wheelchair passengers, or others with similar requirements, said single level off-line station to be either in close proximity to said main guideway, or remote from said main guideway as required by overall system environment.

* * * * *